United States Patent

Barberi et al.

Patent Number: 5,995,173
Date of Patent: Nov. 30, 1999

[54] BISTABLE DISPLAY DEVICE BASED ON NEMATIC LIQUID CRYSTALS ALLOWING GREY TONES

[75] Inventors: Riccardo Barberi, Arcavacada di Rende; Roberto Bartolino, Arcavacata di Rende, both of Italy; Ivan Dozov, Gif S/Yvette; Georges Durand, Orsay, both of France; Michèle Giocondo, Cosenza; Jun Li, Arcavacada di Rende, both of Italy

[73] Assignee: Instituto Nationale per La Fisica Della Materia, Genoa, Italy

[21] Appl. No.: 08/746,384

[22] Filed: Nov. 8, 1996

[30] Foreign Application Priority Data

Nov. 10, 1995 [FR] France ................... 95 13324

[51] Int. Cl.⁶ ............................ G02F 1/133; C09K 19/02
[52] U.S. Cl. ............................................. 349/33; 349/177
[58] Field of Search ................................ 349/177, 33

[56] References Cited

U.S. PATENT DOCUMENTS

| | | | |
|---|---|---|---|
| 4,333,708 | 6/1982 | Boyd et al. | 350/346 |
| 4,400,060 | 8/1983 | Cheng | 350/339 |
| 4,472,026 | 9/1984 | Boyd et al. | 349/136 |
| 4,564,266 | 1/1986 | Durand et al. | 350/340 |
| 4,601,542 | 7/1986 | Meyer | 349/177 |
| 4,601,544 | 7/1986 | Cheng et al. | 349/177 |
| 4,776,674 | 10/1988 | Filas et al. | 350/339 |
| 5,040,876 | 8/1991 | Patel et al. | 350/333 |
| 5,357,358 | 10/1994 | Durand et al. | 349/177 |
| 5,670,258 | 9/1997 | Mitra et al. | 428/405 |

FOREIGN PATENT DOCUMENTS 0 018 180 10/1980 European Pat. Off. .
2 587 506 12/1987 France .

OTHER PUBLICATIONS

Barberi et al., Flow Induced Bistable Anchoring Switching In Nematic Liquid Crystals, Liquid Crystals, 1991, vol. 10, No. 2, 289–293.
Berreman et al., New bistable liquid–crystal twist cell, J.Appl. Phys 52(4), Apr. 1981, 3032–3039.
Barberi et al., Electrically Controlled Surface Bistability in Nematic Liquid Crystals, Appl. Phys. Letter 55(24), Dec. 11, 1989, 2056–2058.
Barberi et al., Flexoelectrically controlled surface Bistible Switching in Nematic Liquid Crystals, Appl. Phys. Lett. 60(9), Mar. 2, 1992, 1085–1086.

*Primary Examiner*—William L. Sikes
*Assistant Examiner*—Tarifur R. Chowdhury
*Attorney, Agent, or Firm*—Pillsbury Madison & Sutro, LLP

[57] ABSTRACT

The present invention relates to a display device based on liquid crystals, comprising a nematic liquid-crystal material (10) with positive dielectric anisotropy sandwiched between two transparent confinement plates (20, 30) each provided with transparent electrodes (22, 32), characterized in that at least one of the plates, (30), defines a quasi-bistable anchoring and in that it is provided with main electrical supply means (40) suitable for applying a temporary electric field to the liquid-crystal material (10) capable of breaking the anchoring on the aforementioned plate (30) and subsequently allowing, due to the effect of hydrodynamic instabilities, various localized orientations of the liquid-crystal molecules (10) corresponding to the preferred orientations of the quasi-bistable anchoring.

23 Claims, 9 Drawing Sheets

4.00 V / div          100 ms / div

BISTABLE DISPLAY DEVICE BASED ON NEMATIC LIQUID CRYSTALS ALLOWING GREY TONES

The present invention relates to the field of display devices based on liquid crystals.

Many display devices based on liquid crystals have already been proposed.

Those skilled in the art know that by using the bistable anchoring properties of nematic liquid crystals, it is possible to produce electrooptic devices characterized by a very rapid electrical addressing time, of the order of a few microseconds, and a rapid optical response time, of the order of one millisecond. These properties make it possible to construct large-size matrix devices with a high resolution and infinite multiplexing capabilities.

Hitherto, two main bistable display devices based on surface properties have been proposed. One of them relies on a flexoelectric effect (see document WO-A-92/00546, and the other relies on an electrochiral effect, see document WO-A-91/11747. Both these devices use a sandwich-type structure comprising a liquid-crystal layer confined between two transparent plates. They exhibit two well-defined volume textures possessing different optical properties. These two textures are defined by a suitable choice of the surface directors on the two confinement plates.

The object of the present invention is now to improve the known bistable liquid-crystal display devices in order to allow gray tones to be obtained, something not allowed by known bistable display devices.

This object is achieved according to the present invention by virtue of a display device comprising a nematic liquid-crystal material with positive dielectric anisotropy sandwiched between two transparent confinement plates each provided with transparent electrodes, characterized in that at least one of the plates defines a quasi-bistable anchoring, and in that it is provided with main electrical supply means suitable for applying a temporary electric field to the liquid-crystal material capable of breaking the anchoring on the aforementioned plate and subsequently allowing, due to the effect of hydrodynamic instabilities, various localized orientations of the liquid-crystal molecules corresponding to the preferred orientations of the quasi-bistable anchoring.

According to another advantageous characteristic of the present invention, the device furthermore comprises secondary electrical supply means capable of applying an erasing electric field to the liquid-crystal material making it possible to re-establish an anchoring of uniform orientation on the plate exhibiting a quasi-bistable anchoring.

As will be explained below, the device in accordance with the present invention makes it possible to obtain a variable contrast, and consequently variable gray tones, by modifying the strength of the electric-field pulses output by the main electrical supply means.

According to another advantageous characteristic of the present invention, the plates define, in the off state, a hybrid structure for the liquid-crystal molecules: planar on the quasi-bistable anchoring plate and homeotropic on the opposite plate.

According to another advantageous characteristic of the present invention, one of the plates, namely preferably the plate opposite that defining the quasi-bistable anchoring, is suitable for injecting charges of defined polarity into the liquid-crystal material.

Other characteristics, objects and advantages of the present invention will appear on reading the detailed description which will follow and with regard to the appended drawings which are given by way of nonlimiting examples, in which:

FIG. 1 diagrammatically represents a liquid-crystal display device in accordance with the present invention;

FIG. 2 diagrammatically illustrates a fluid movement obtained in the liquid-crystal volume when the Felici threshold is reached;

FIG. 3 diagrammatically represents a hybrid, homeotropic/planar, structure in accordance with a display device according to the present invention, in the off state;

Figure 11:
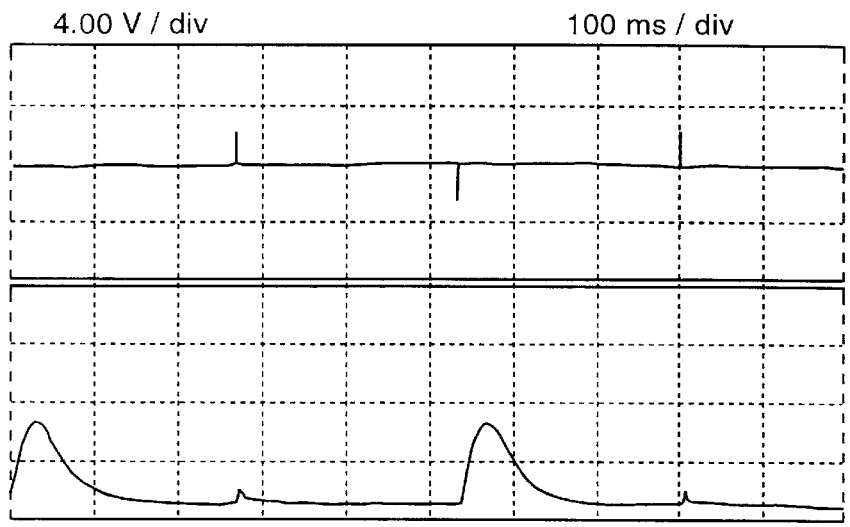
Figure 12:
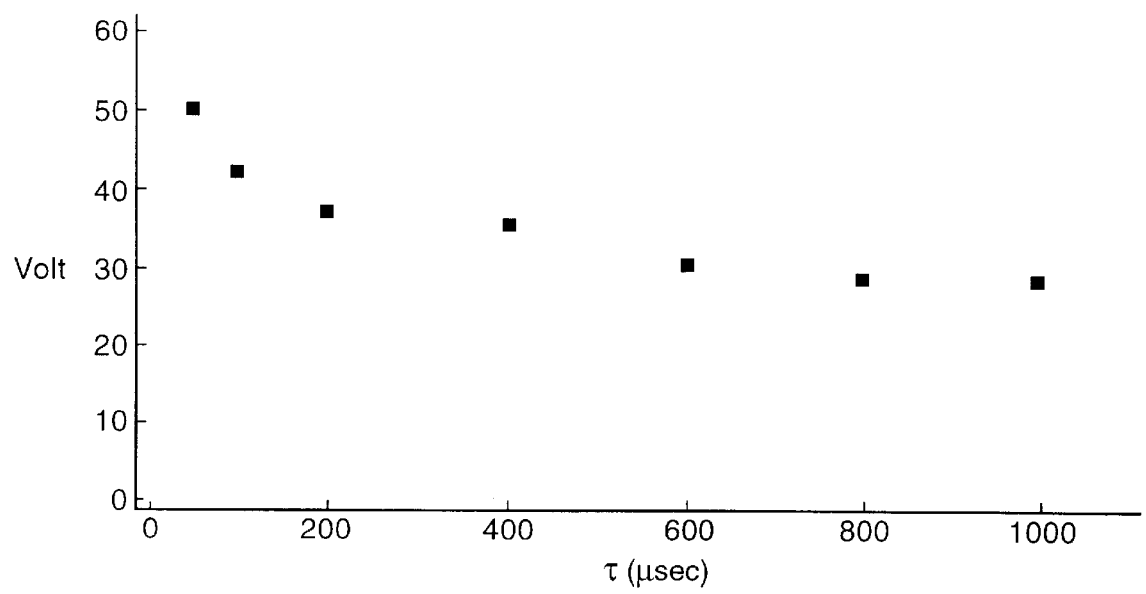
Figure 13:
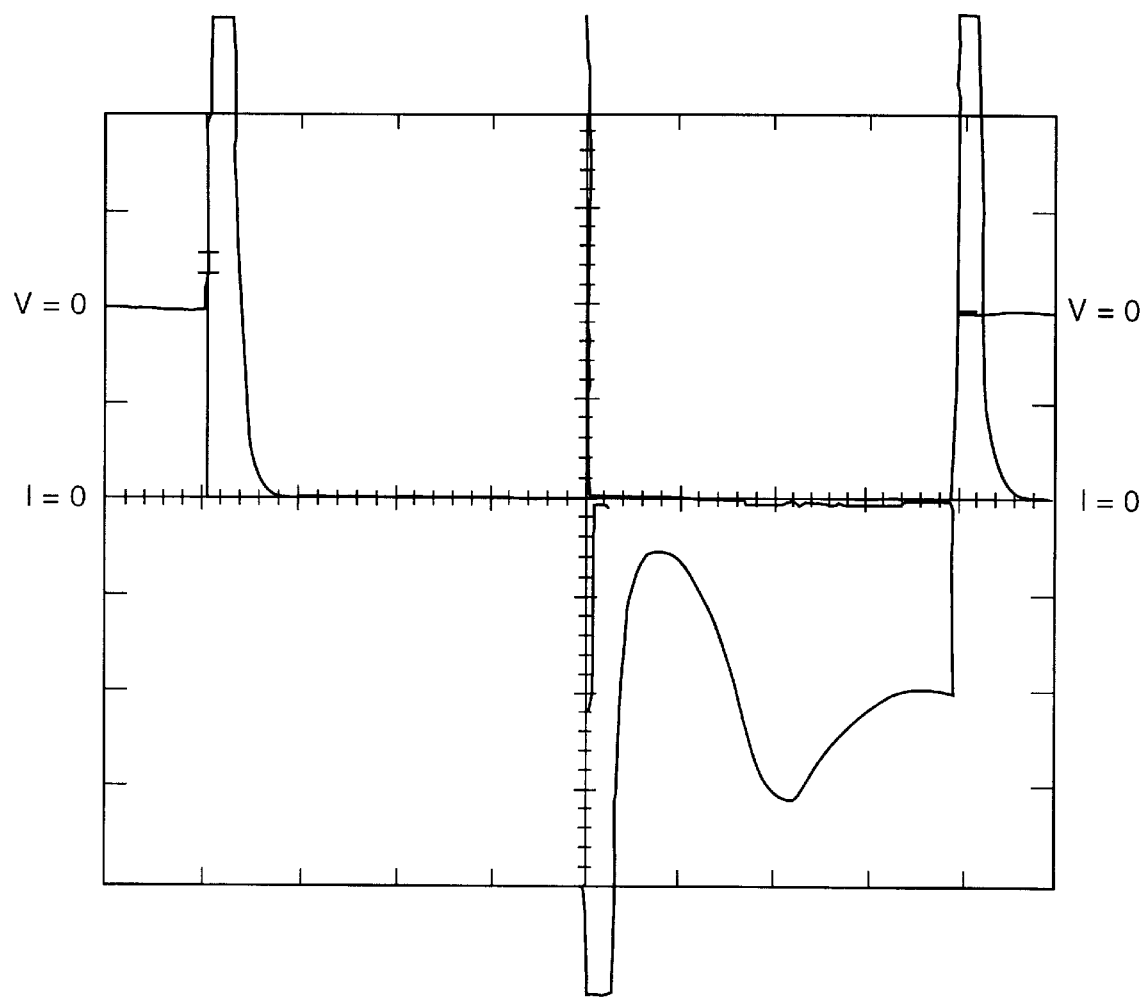

FIGS. 9$a$ and 9$b$ represent the transmitted intensity as a function of the applied electric field, plotted for two display devices in accordance with the present invention;

FIGS. 10$a$, 10$b$ and 10$c$ represent the transmitted light as a function of time, plotted for three display devices in accordance with the present invention, subjected to pulses of alternating polarities, respectively in order to write gray tones and to erase them;

FIG. 11 represents a similar curve obtained with pulses of strength insufficient to generate stable surface defects;

FIG. 12 represents a curve of the strength of the required drive voltage, as a function of its duration;

FIG. 13 diagrammatically represents the behavior of an ion current as a function of time for respectively positive and negative drive pulses; and FIGS. 14$a$ and 14$b$ illustrate ion currents obtained on two devices with drive pulses of variable strength.

The display device in accordance with the present invention comprises, as do prior devices, a layer of liquid-crystal material 10 sandwiched between two plane and parallel transparent confinement plates 20, 30, typically made of glass. These plates 20, 30 are provided on their internal surface, in a manner known per se, with electrodes 22, 32 which are also transparent.

These electrodes 22, 32 are connected to electrical supply means 40 which make it possible to apply an electric field E, with an orientation perpendicular to the plates 20, 30 and with a controlled polarity and controlled amplitude, to the liquid-crystal material 10.

The liquid-crystal material 10 is formed by nematic liquid-crystal molecules with positive dielectric anisotropy.

At least one of the plates, 30, defines a quasi-bistable anchoring. This concept will be explained later.

Moreover, the main electrical supply means 40 are suitable for applying a temporary electric field E to the liquid-crystal material 10 capable of breaking the anchoring on the aforementioned plate 30 and subsequently allowing, due to the effect of hydrodynamic instabilities, various localized orientations of the liquid-crystal molecules corresponding to the preferred orientations of the quasi-bistable anchoring.

The device in accordance with the present invention consequently operates by breaking the surface alignment on this plate 30 by virtue of electrical pulses of well-defined polarity output by the means 40.

According to the invention, switching occurs between an ordered texture and a disordered texture.

Figure 3:
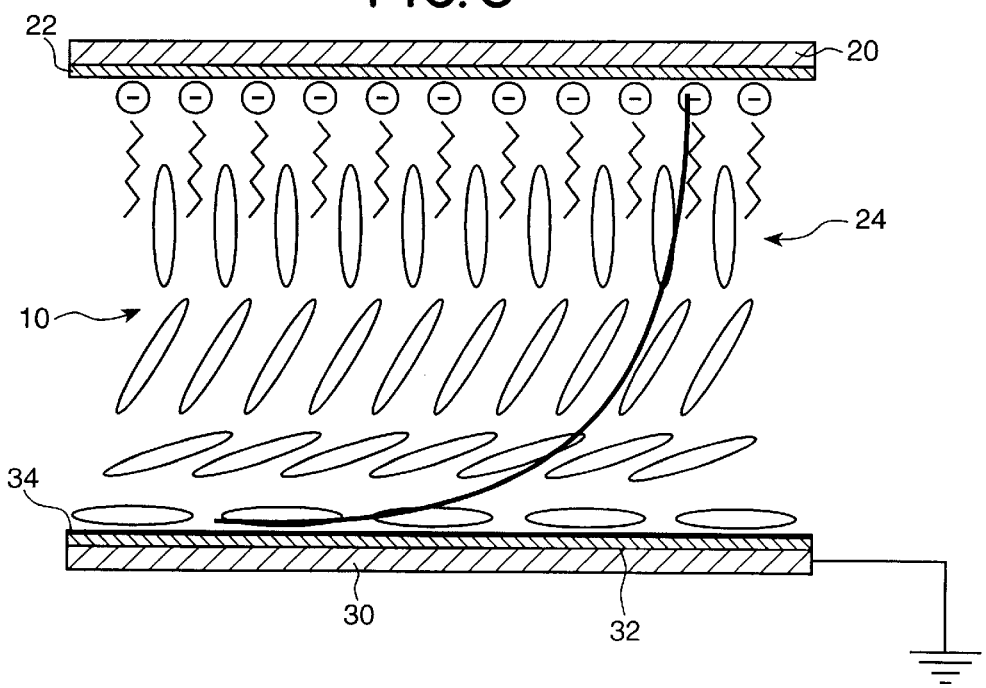
Figure 4:
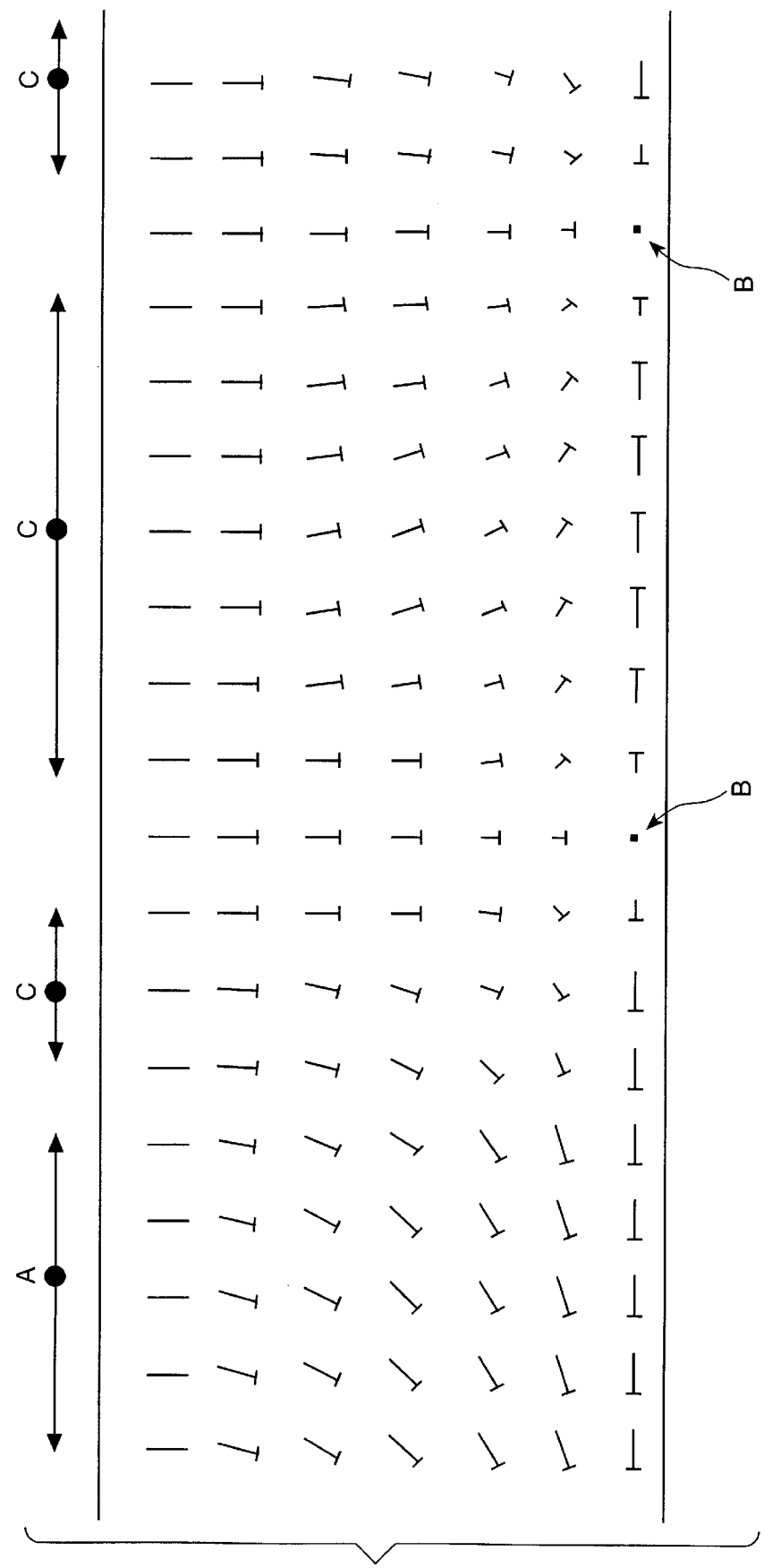
FIG. 4 illustrates the twisted structure of the liquid crystal, obtained within the context of the present invention, after applying an appropriate electric field, due to the effect of surface defects.

The back plate 20 preferably exhibits a homeotropic alignment, while the plate 30 defines an alignment of the planar type, as may be seen in FIGS. 3 and 4 especially. The fundamental geometry of the cell is therefore of the hybrid type.

This device makes it possible to obtain variable gray tones by controlling the strength of the drive voltage output by the supply means 40.

The display device in accordance with the present invention does not require a pure bistable anchoring, but only a surface "compatible" with such a bistable anchoring, which will be termed hereafter "quasi-bistable" anchoring. Such an anchoring will be explained in more detail later. Switching is obtained between an ordered hybrid texture, which possesses optical properties similar to a planar texture, and a disordered state resulting from an array of surface defects which are stabilized by the quasi-bistable anchoring. Optical contrast may be achieved, for example, by placing the cell between two crossed polarizers, the optical axis of the cell being aligned with one of the polarizers. In this configuration, the hybrid state does not transmit light, while when an array of defects is present, this acts as a depolarizer, and light is transmitted.

The concept of "quasi-bistable" anchoring will now be explained.

A plate 30 exhibits a quasi-bistable anchoring for a nematic liquid crystal when the surface ground state is monostable and planar, but slightly higher-energy bistable anchorings, which are also planar or slightly oblique, are also present.

Within the context of the present invention, such a quasi-bistable anchoring may be obtained with the aid of an oblique deposition of SiO, at 74° with respect to the normal to the surface of the plate, the coating conditions being similar to those necessary for obtaining a pure oblique bistable anchoring. Compared with the arrangements described in document [1], "Order, electricity and oblique nematic orientation on rough solid surfaces" in Europhys. Lett. 5,697 (1988) by M. Monkade et al., or else in document [1bis], "Critical Behaviour of a Nematic-Liquid-Crystal Anchoring at a Monostable-Bistable Surface Transition" in Europhysics Letters, (25) (7), pp 527–531 (1994) by M. Nobili et al., the device in accordance with the present invention is placed just below the transition region between the monostable planar and degenerate oblique anchorings. The ground state is a monostable planar easy axis perpendicular to the SiO deposition beam, but bistable oblique surface directors, which are symmetrical with respect to the vertical evaporation plane and are metastable, may also be observed.

Such a surface treatment is similar to that obtained for a bistable nematic device exploiting a flexoelectric effect, but possesses a smaller SiO film thickness.

Other processes making it possible to obtain bistable and quasi-bistable anchorings, capable of being used within the context of the present invention, are described in document [2] "Photoinduced Optical Anisotropy in Langmuir-Blodgett Films as a New Method of Creating Bistable Anchoring Surfaces for Liquid Crystal Orientation" in J. Phys. II France 5 (1995) 133–142 by S. P. Palto et al.

This document essentially describes the formation of bistable anchorings with the aid of thin Langmuir-Blodgett films exhibiting an optical anisotropy. This document should be regarded as being incorporated into the present description by the reference made to it here.

According to yet another alternative form, the quasi-bistable anchoring may be obtained by virtue of a polymer layer containing dichroic absorbent components, having been subjected to the same optical treatment as described in the aforementioned document [2].

Bistable and quasi-bistable anchorings may be broken by a suitable external electric field E. The anchoring breaking is due to the surface molecules reorienting due to the effect of a dielectric moment. In fact, an external electric field E perpendicular to the confinement plates 20 and 30 tends to orient a nematic liquid crystal 10, possessing a positive dielectric anisotropy [$\epsilon_a$>0], perpendicular to the elctrodes 22, 32 provided on the plates 20, 30 (homeotropic orientation).

This transition requires that the electrical coherence length $\xi=(1/E) (4\pi K/\epsilon_a)^{1/2}$ of the external field be of the same order of magnitude as the extrapolation length L~500 Å of the surface anchoring, with an electric field strength typically of about $E=(1/L) (4\pi K/\epsilon_a)^{1/2}$~8 volts/$\mu$m.

The anchoring breaking enables rapid transitions between the various surface states to be obtained in the case of the liquid-crystal material 10. The characteristic transition time is defined by $\tau=4\pi \ \eta_s/E^2\epsilon_a$, in which equation $\eta_s$ represents the surface viscosity. The value of $\tau$ may be less than 1 $\mu$s.

This phenomenon is mentioned in documents [3], "Dynamics of surface anchoring breaking in a nematic liquid crystal", in Liquid Crystals, 12, 515 (1992) by A. Gharbi et al., and [3bis], "Flexoelectrically controlled surface bistable switching in nematic liquid crystals" in Appl. Phys. Lett. 60 (9), (1992) by R. Barberi et al., reference to which will be useful for a proper understanding of the present invention.

The display devices in accordance with the present invention exploit a hydrodynamic effect known by the name of "Felici effect" which will now be explained.

The conductivity of a nematic liquid crystal is generally low. Such a material may even be regarded as a pure dielectric.

However, a high external electric field may inject charges of a given polarity into this material.

This injection phenomenon, well known to those skilled in the art, may be favored by an appropriate treatment of the interface between the electrodes 22 and the liquid-crystal material 10.

When the injected charges are uniform, they flow uniformly due to the effect of the electric field E in the liquid 10, which remains stable.

Figure 2:
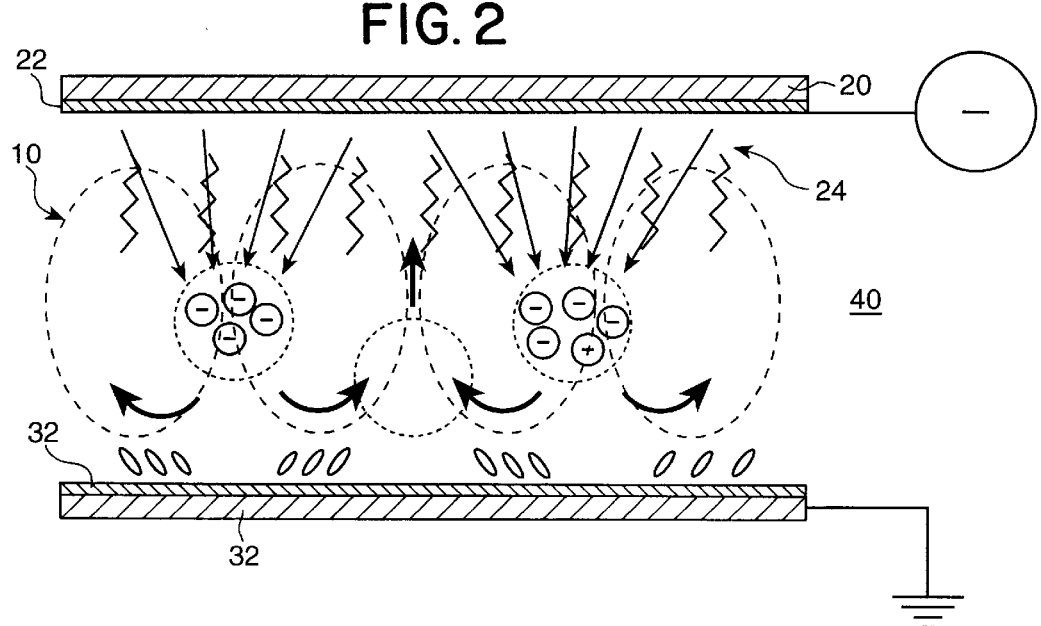

Nevertheless, instabilities in the flow of the charges may occur: the resulting differential localized concentrations of charges produce differential forces on the liquid 10, which lead to flows in the form of convective cells as shown diagrammatically in FIG. 2.

This behavior known by the name of the "Felici effect" is described, for example, in document [4] "Phénomènes hydro et aérodynamiques dans la conduction des diélectriques fluides" [Hydrodynamic and aerodynamic phenomena in the conduction of fluid dielectrics] " in Revue Générale de l'électricité [General Electricity Journal], July–August 1969 by N. Felici.

Electrodynamic convections are obtained when the Felici threshold is reached:

$$qEd^3/\eta D=1$$

In the above expression, q represents the average charge density per unit volume, E represents the electric field, d represents the thickness of the cell between the plates 20 and 30, $\eta$ represents the average nematic viscosity and D represents the diffusion coefficient for ions. Such a process is shown diagrammatically in the appended FIG. 2.

The drive means 40 in accordance with the present invention are therefore designed to reach this Felici threshold.

For fixed values of $\eta$, D and q, the Felici threshold shows that the voltage $V_F$ required to obtain hydrodynamic turbulence in the nematic is proportional to the $d^{-2}$.

More specifically, FIG. 2 illustrates the fluid movement when the Felici threshold is reached in a device in which only one type of electrically charged particle is present. Two adjacent convective cells tend to align the nematic molecules close to the quasi-bistable anchoring plate 30, in opposite directions with respect to the normal to the surface, when the surface anchoring is broken. More specifically still, as will be explained later, the injection, in this case of negative ions responsible for the convection is favored by the coating material provided for defining a homeotropic alignment on the upper plate 20, this material being, for example, DMOAP silane.

Surface defects are often observed on bistable or quasi-bistable anchoring plates. On a purely bistable plate, they separate nematic domains corresponding to different easy orientations. On a quasi-bistable plate 30, as used within the context of the present invention, their topology is compatible with the quasi-bistable degenerate oblique anchoring and they may remain metastable on the surface for a very long time.

Document [5], "Surface walls on a bistable anchoring of nematic liquid crystals" in J. Phys. II France 5, 531 (1995) by M. Nobili et al., is mentioned by way of reference for the description of such nematic surface structures.

An array of surface defects may be created on the quasi-bistable anchoring plate 30 by applying an external electric field E of a strength sufficient to allow anchoring breaking when, moreover, conditions for convective movement of the fluid 10 are combined in the device.

If the aforementioned Felici threshold is reached, the convective fluid movement induces hydrodynamic moments on the nematic surface directors. As shown in FIG. 2, two adjacent convective cells tend to align the nematic molecules on the quasi-bistable plate 30 in opposite directions with respect to the normal to the surface.

When the electric field is cut off, the surface molecules drop back down to the planar orientation in the opposite directions to which the flow inclined them. These opposite directions create surface defects on the quasi-bistable plate 30 which are compatible with the quasi-bistable anchoring.

Volume defects may also be produced which can move toward the quasi-bistable plate 30 and become surface defects.

Moreover, within the context of the present invention, the aforementioned array of defects on the internal surface of the plate 30 may be erased by an electrical pulse output by the means 40, which does not induce the convective movement of the nematic liquid-crystal material 10 but the strength of which is sufficient to break the surface anchoring.

These conditions may be obtained by virtue of a voltage pulse, the polarity of which is opposite to that required to obtain the Felici effect, and a suitable treatment of the electrode 22 in order to avoid charge injection. The same conditions may be obtained alternatively with electrical pulses whose sign is the same as that of the write pulses and the strength is sufficient to break the surface anchoring but slightly weaker than that necessary to create the Felici instabilities, if the Felici threshold is greater than the surface breaking threshold.

Another, simpler, way of erasing consists in using a high-frequency alternating field E which breaks the surface without creating the Felici instability or other instabilities.

A particular embodiment of a display device in accordance with the present invention will now be described.

The material 10 used is a nematic liquid-crystal material exhibiting a positive dielectric anisotropy, $\epsilon_a>0$. More specifically, within the context of a preferred embodiment of the present invention, 5CB pentylcyanobiphenyl is used, this possessing a dielectric anisotropy of about 10.

Figure 1:
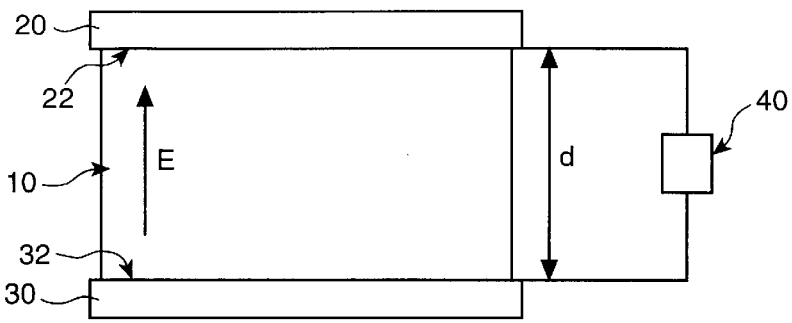

A pixel is formed between two parallel transparent plates 20, 30 which contain between them the nematic liquid crystal 10, as illustrated in FIG. 1. The plates 20, 30 are provided with electrodes 22, 32 consisting of a thin transparent ITO film produced by deposition. One of the plates, 20, is provided with a silane coating 24. This material is known to facilitate unipolar charge injection (see the aforementioned Felici document). The silane is also known to favor preferred surface orientations of the nematic.

Of course, the silane may be replaced with any functionally equivalent material.

More specifically still, one of the plates, 20, is treated in order to define a unique homeotropic easy axis with a coating 24 of DMOAP (ortho-decyl-dimethyl-[3-(trimethoxysilyl)-propyl] ammonium chloride). The second plate 30 is treated in order to define a quasi-bistable anchoring, by virtue of a coating 34 of SiO as described previously.

The ground state of the cell obtained is a hybrid texture as illustrated in FIG. 3. The molecules of the liquid crystal 10 adopt a homeotropic orientation on the plate 20 and a planar orientation on the other plate 30, by virtue of the fundamental planar axis of easy orientation of the quasi-bistable surface.

An array of volume defects may be created with the aid of appropriate electrical pulses output by the means 40, by virtue of electrohydrodynamic instabilities. Such an array is generally repelled by a conventional monostable surface. On the other hand, the quasi-bistable plate 30 accepts the surface defects, which stabilizes the volume configuration.

The two textures, hybrid and disordered, do not possess the same energy. The hybrid state is preferred because it corresponds to a lower energy state. Nevertheless, the array of surface defects is perfectly stable when its density is sufficiently high, since they are mutually blocking.

The lifetime of a single defect may be controlled from a few milliseconds to several seconds by modifying the SiO deposition conditions. Close deposition conditions for a bistable configuration determine a longer lifetime for the surface defects.

The inventors have performed various tests by applying an electric field E to the material 10 between the electrodes 22, 32 perpendicular to the plates 20, 30. In the course of these tests, the earth for the drive signals was connected to the electrodes 32 of the quasi-bistable anchoring plate 30 treated with SiO.

The tests were performed on single-pixel display devices and on multiple-pixel display devices.

The display devices used possess thicknesses varying between 1 and 10 $\mu$m.

The tests were carried out in transmitted light, the device being placed between two crossed polarizers.

To do this, the optical axis of the device, defined when the liquid crystal occupies its off-state hybrid configuration, is aligned with the optical axis of one of the polarizers.

In its hybrid configuration, the device behaves as a conventional uniaxial birefringent plate whose optical anisotropy is half that of a conventional uniform planar nematic cell with the same thickness. No light is transmitted between two crossed polarizers because of the optical configuration adopted.

However, when a twisted structure is obtained, as illustrated in FIG. 4, in the presence of an array of surface defects resulting from the application of suitable field pulses, the light is depolarized by the twisted regions around each defect, and consequently light is transmitted.

This FIG. 4 shows diagrammatically at A a twist-free hybrid configuration region, far from the defects, at B two surface defects and at C regions of high twist close to these defects.

The intensity of transmitted light depends on the density of the defects and consequently on the strength of the drive pulses applied. This is because when the defects have a maximum density the resulting configurations of eddy flow motions of size comparable to the thickness of the cell induce a rotation of from 30° to 90° to the polarization of the light over most of the entire surface of the device, provided that the Mauguin condition is met. Reference may be made on this point to document [6] by P. G. de Gennes, "The Physics of liquid crystals", Clarendon Press, Oxford, 1974.

This condition is met for devices having a thickness at least equal to 4 µm, for example.

The inventors have in particular made the following observations on devices of a thickness of 4 and 8 µm, possessing a DMOAP coating 24, a liquid crystal of the 5CB type and a 75° SiO deposition 34 with a thickness of 155 Å.

The device in question was observed using a Zeiss polarizing microscope between crossed polarizers. The light transmitted through the device was collected on a photodiode and its intensity as a function of time was recorded on a digital oscilloscope and printed on paper.

In this case, the two electrodes 22 and 32, on the plates 20 and 30, were connected to the means 40 designed to generate square pulses of variable and controlled amplitude and width.

In the absence of electrical excitation, the stable state of the cell corresponds to the defect-free hybrid configuration. The device consequently exhibits a black appearance through crossed polarizers, as illustrated in FIG. 5.

In the case of the 4 µm thick cell, on the other hand, applying a negative square pulse to the electrode 22, with an amplitude of 50 volts and a duration of 100 µs, creates the aforementioned array of surface defects. The cell then has the bright appearance illustrated in FIG. 8.

Subsequently applying negative pulses, similar to the previously mentioned first pulse, does not alter the bright appearance.

Figure 5:
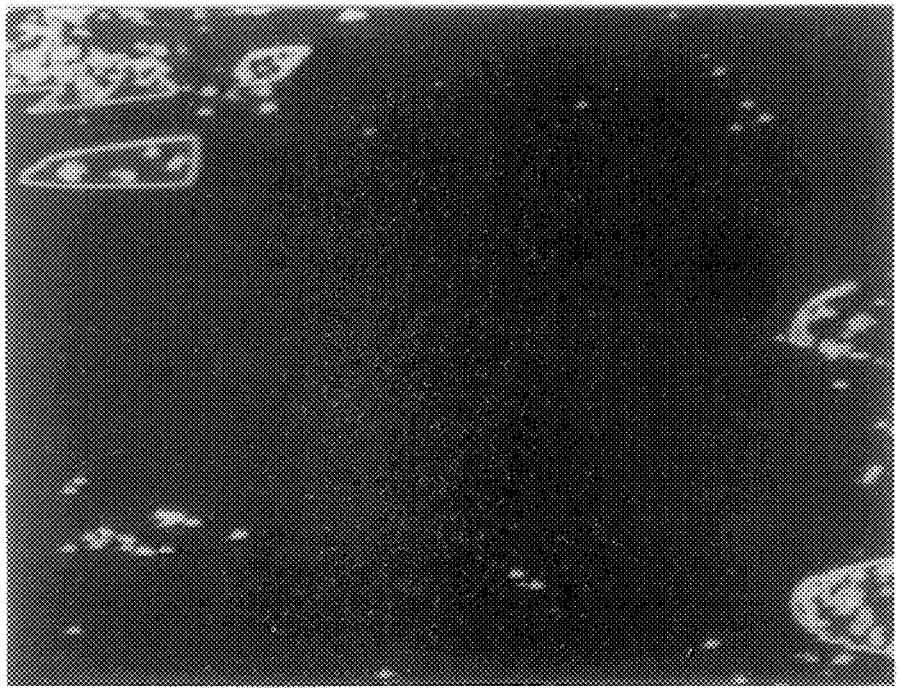
FIG. 5 represents the appearance of a display device in accordance with the present invention, in the off state.

On the other hand, applying a positive pulse to the electrode 22, with an amplitude of 40 volts and a duration of 100 µs, makes it possible to recover the initial hybrid texture and consequently the black appearance illustrated in FIG. 5.

Here too, applying successive positive pulses, similar to the aforementioned first one, has no effect on the device which remains in the black state.

In the absence of other electrical excitation, the cell remains in the black state.

On the other hand, the inventors have observed that the bright state could be less stable, its lifetime depending in particular on the characteristics of the SiO coating, on the density of the defects and on the thickness of the cell, possibly ranging from a few ms to several hours.

The inventors have also demonstrated that a gray scale could be obtained for a fixed duration of negative electric drive pulse by varying its amplitude so as to obtain a different density of the array of surface defects.

Figure 6:
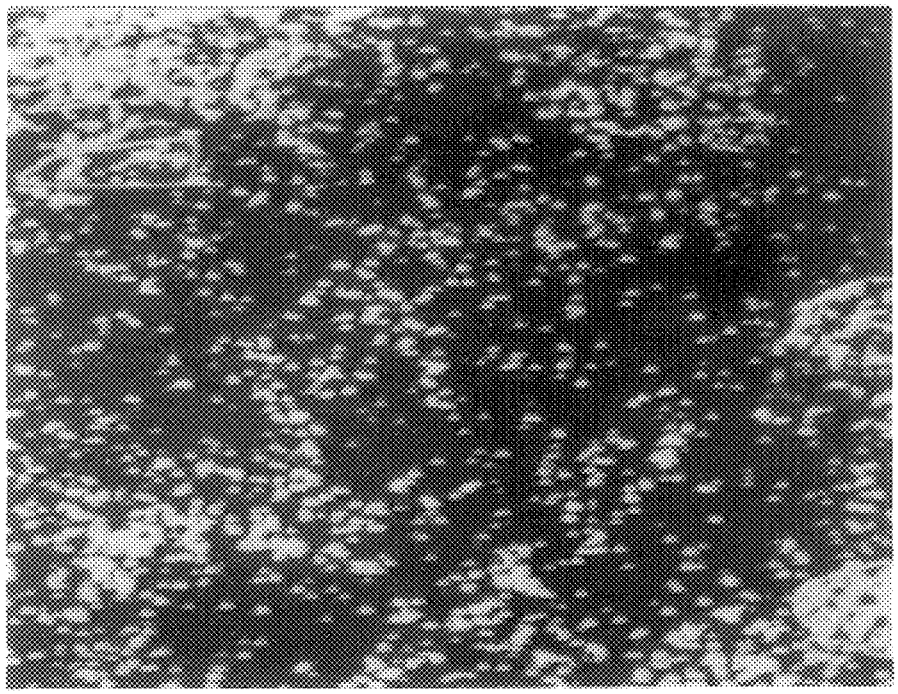
FIGS. 6, 7 and 8 represent the appearance of the same display device in accordance with the present invention after applying electric-field pulses of increasing amplitude.
Figure 7:
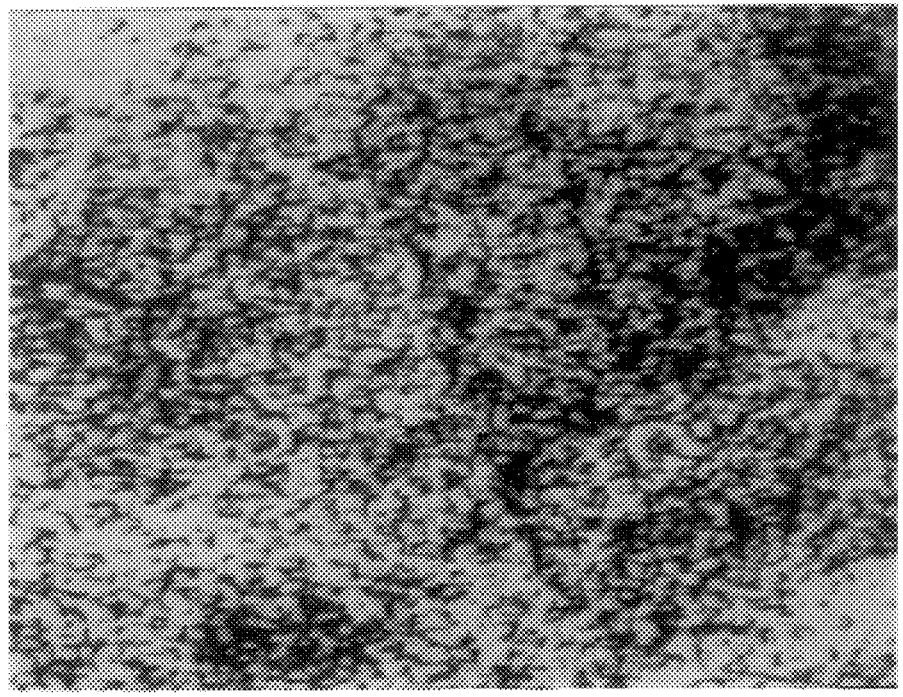
Figure 8:
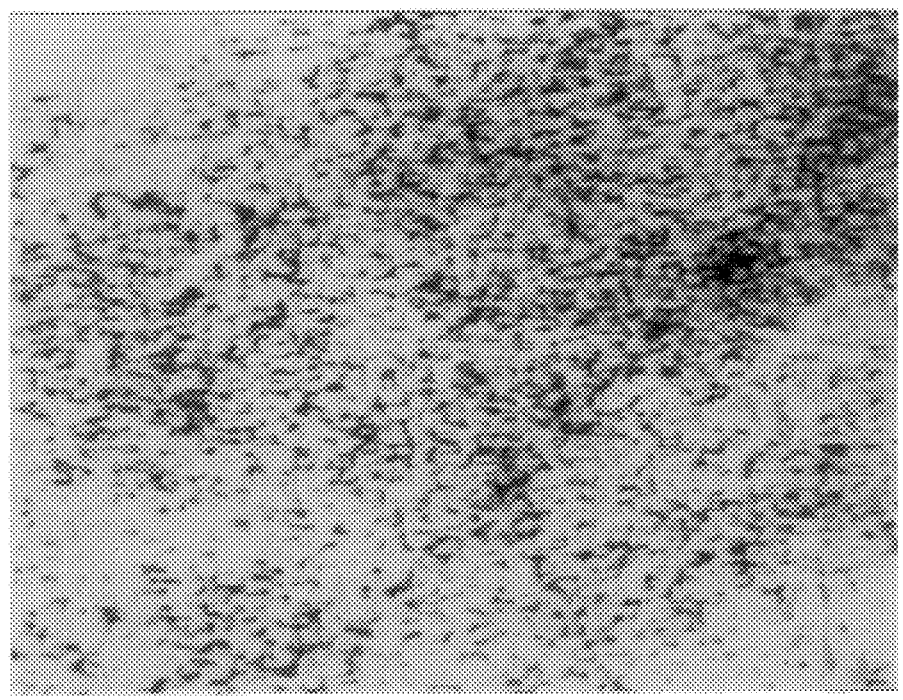

FIGS. 6 and 7 thus represent the appearance of the 8 µm cell after excitation by negative pulses whose amplitude is less than that required to saturate the density of surface defects, as illustrated in FIG. 8. The strength of the pulses corresponding to FIG. 7 is greater than that of the pulses corresponding to FIG. 6. FIGS. 6 to 8 show that the density of the surface defects increases progressively with the strength of the drive pulses applied.

The representations in FIGS. 5 to 8 correspond to an observed region of about 1 mm².

Figure 9A:
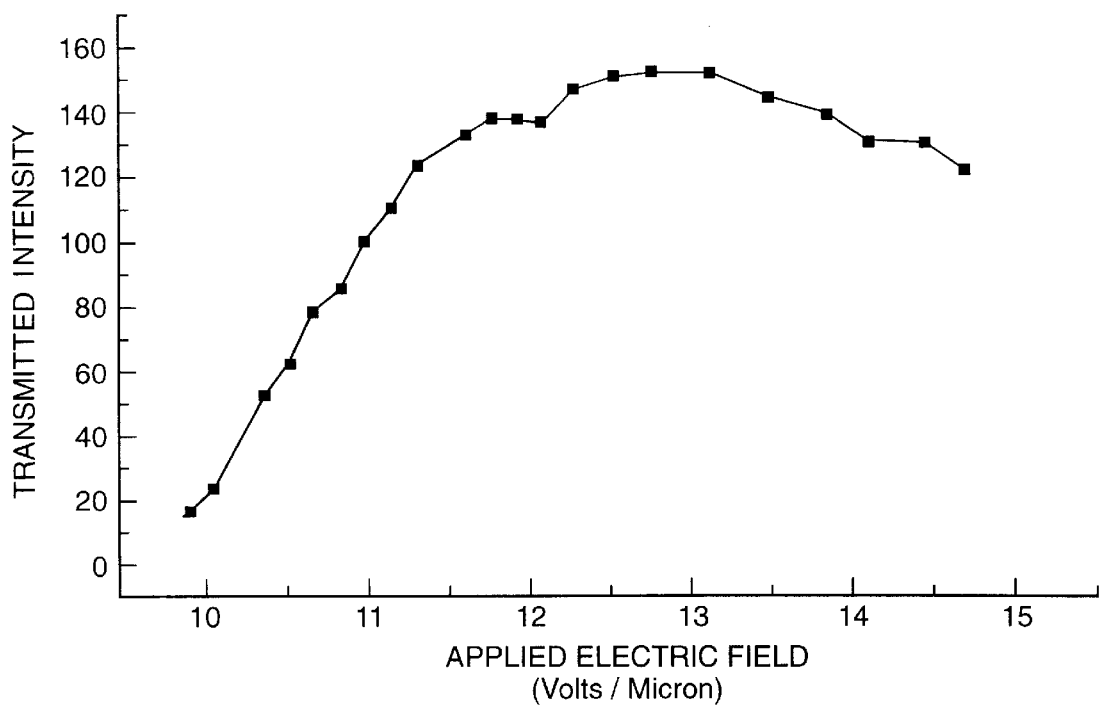
Figure 9B:
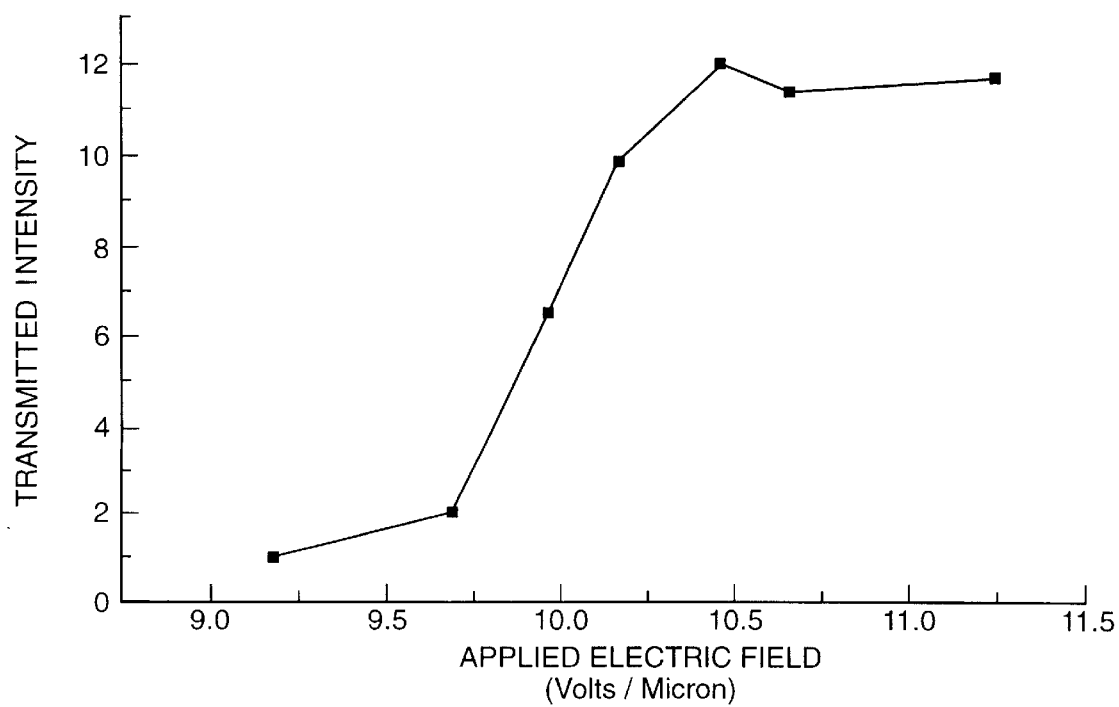

Moreover, FIGS. 9a and 9b represent the transmitted optical intensity, as a function of the strength of the applied electric field, for two specimens having a thickness of 5 µm and 1.9 µm respectively.

By examining these FIGS. 9a and 9b, it will be understood that the optical contrast may be easily modulated over a range of from 1 to 100 simply by modifying the strength of the electric field over a 2 volts/µm range (that is to say for a specimen having a thickness of 4 µm using a modulation of 8 volts with respect to the saturation value of about 50 volts).

FIG. 9a also shows that when the voltage applied is too high the density of surface defects tends to decrease. This shows that the erasure of the cell may be obtained with high-amplitude pulses of the same polarity as those used for writing, that is to say having the same polarity as the pulses used to go from the appearance in FIG. 5 to one of FIGS. 6 to 8.

The inventors have obtained a maximum optical contrast of 200:1 for a specimen having a thickness of 8 µm, of 160:1 for a thickness of 5 µm and of 120:1 for a thickness of 1.9 µm.

Figure 10A:
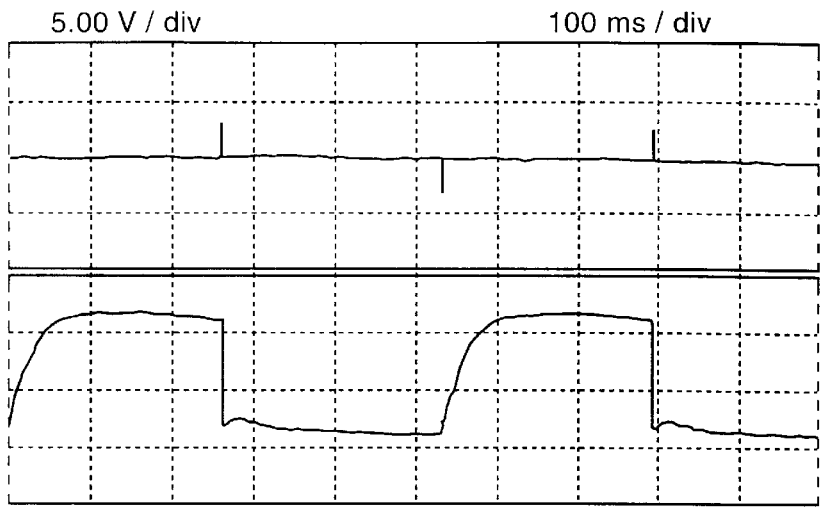

FIG. 10a shows a curve of transmitted light intensity as a function of time for a specimen having a thickness of 10 µm, after successive applications of negative writing and positive erasing pulses illustrated at the top of this same FIG. 10a.

Figure 10B:
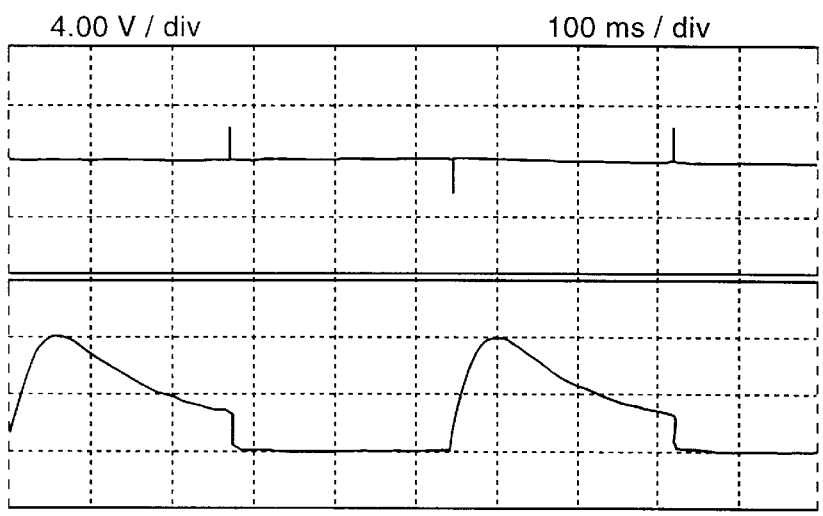
Figure 10C:
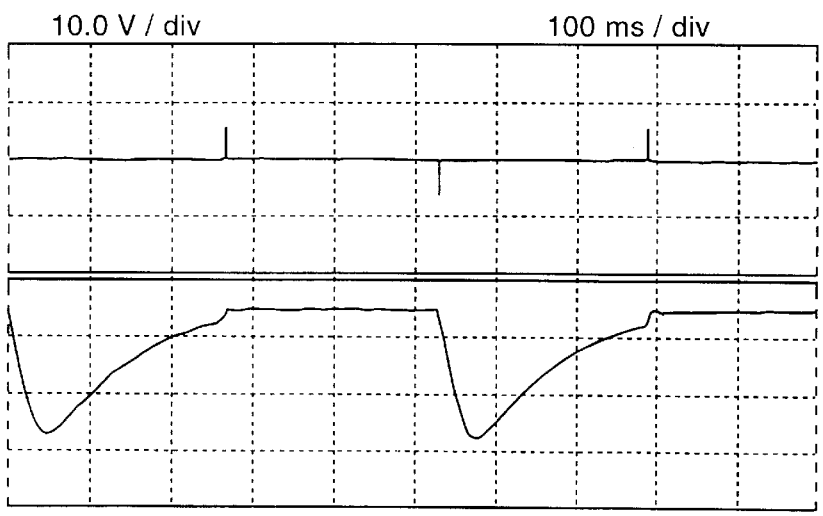

FIGS. 10b and 10c show similar curves for specimens having a thickness of respectively 5 µm and 1.9 µm.

In this case, the duration of the pulses was 150 µs for all the specimens.

From FIGS. 10 it may be seen that, in the case of the transition of going from the black appearance to the bright appearance, the typical delay between the excitation pulse and the maximum in the intensity of the transmitted light varies from 25 ms for the thinnest cell to 70 ms for the thickest cell.

The opposite transition, from the bright state to the black state, is more rapid, of about one millisecond.

It also seems that, for this same surface coatings, the lifetime of the surface defects is longer for the thicker specimens. This is due to the fact that the surface defects impose substantially higher distortion energies on the thin specimens than for the thicker specimens.

Thus the behavior illustrated in FIG. 10a is very similar to a purely bistable device, in FIG. 10b the surface defects are less stable and the optical contrast decreases after a maximum and, in FIG. 10c, the surface defects disappear after 0.5 s.

FIG. 11 shows the intensity of transmitted light as a function of time, for a specimen having a thickness of 5 µm when the strength of the write pulse is less than the threshold required to form the surface defects, but sufficient to initiate breaking of the quasi-bistable anchoring. FIG. 11 corresponds to one 150 µs negative pulse with a strength of 45 volts. The maximum in the optical contrast for this transient optical effect is about 60:1 and the light is transmitted with a high intensity for more than 50 ms. Such a transient effect can be used, for example, to produce multiplexed displays on a video apparatus. This is because, in this case, the required persistence time for the bright pixel is about a few tens of milliseconds. Of course, it is clearly apparent that in this case no erasing pulse is required since the phenomenon involved is transient.

The inventors have also measured the dynamics of the electrical response obtained. To do this, square electrical pulses of amplitude V and duration $\tau_V$ were used. The threshold required to completely write all the defects with the saturation density $V_s(\tau)$ was measured. The results obtained are plotted in FIG. 12.

The voltage threshold of opposite polarity necessary for complete erasure of the pixel was also measured. The results obtained are very similar to those required for the writing and are illustrated in FIG. 12.

In order to test the erasure mechanism, the inventors also used alternating pulses of zero average value and the same amplitude and duration. With such an alternating pulse, the inventors have obtained erasure comparable to that resulting from pulses of defined polarity but with slight changes in amplitude. This observation demonstrates that the erasure process is a purely dielectric process, with no relation to the ions.

Under the conditions of the experiment, the inventors have observed that the Felici threshold was 15 volts for a 4 $\mu$m specimen.

The writing and erasing voltages are about 50 volts for 50 $\mu$s, in the video regime. They may be reduced by using a thinner specimen since the surface breaking threshold is well above the Felici threshold. Increasing the injected current makes it possible to reduce V at a constant thickness, as indicated previously.

It is also possible to reduce the Felici threshold by appropriate treatment of the electrodes. To do this, the current-injection electrodes may be produced, for example, not in a uniform form but in the form of electrically conductive and nonconductive bands with a period which, compared to the size of the defects and to the thickness of the cell, favor the formation of ion agglomerates in the cell and consequently reduce the Felici threshold. In practical terms, this may be achieved by rubbing the coating surface forming the electrode.

Insofar as the observed surface transitions are subjected to well-defined thresholds, the display device in accordance with the present invention allows multiplexing-type control.

The inventors have also made the following observations which justify the model presented above.

When a specimen is subjected to a series of rapid electrical pulses, with an amplitude slightly less than the threshold required to form surface defects and with a sufficient frequency, electrodynamic instabilities are observed in the cell. This condition may be obtained, for example, by subjecting a specimen having a thickness of 8 $\mu$m to negative pulses (the same as those which create defects) with an amplitude of 44 volts, a length of 600 $\mu$s and a frequency of 18 Hz. The length of the pulse is chosen here to be longer than the case of the aforementioned surface switching in order to demonstrate the induced fluid movement.

The electrodynamic activity observed is due to the movement of ions in the cell. This hypothesis is proved by measuring the electric current in the liquid-crystal cell. FIG. 13 shows the typical shape of the current passing through a cell in the two cases of positive and negative pulses.

The positive pulse (which erases the surface defects) generates only a capacitor discharge current combined with a rapid dielectric reorientation peak, which is not visible in FIG. 13.

When the negative pulse (which creates the defects) is present, a slower second pulse, due to the injected ion current, appears.

This behavior indicates that most of the mobile ions present in the cell possess the same sign. Thus, only one pulse polarity induces electrodynamic instabilities, which are responsible for creating the surface defects. In the geometry described, the sign of the ion responsible for this phenomenon is negative. The ions may be due to natural molecular dissociation of the nematic material, which is used as pure as possible, since in such a case the same phenomenon will be observed for both pulse polarities. The source of negative ions is formed by the material used to ensure homeotropic alignment. In fact, DMOAP may inject $Cl^-$ negative ions into the nematic material or favor the injection of other negative ions, such as $OH^-$ for example. These ions are moved by the external electric field and electrodynamic convections are obtained when the Felici threshold is reached.

Figure 14A:
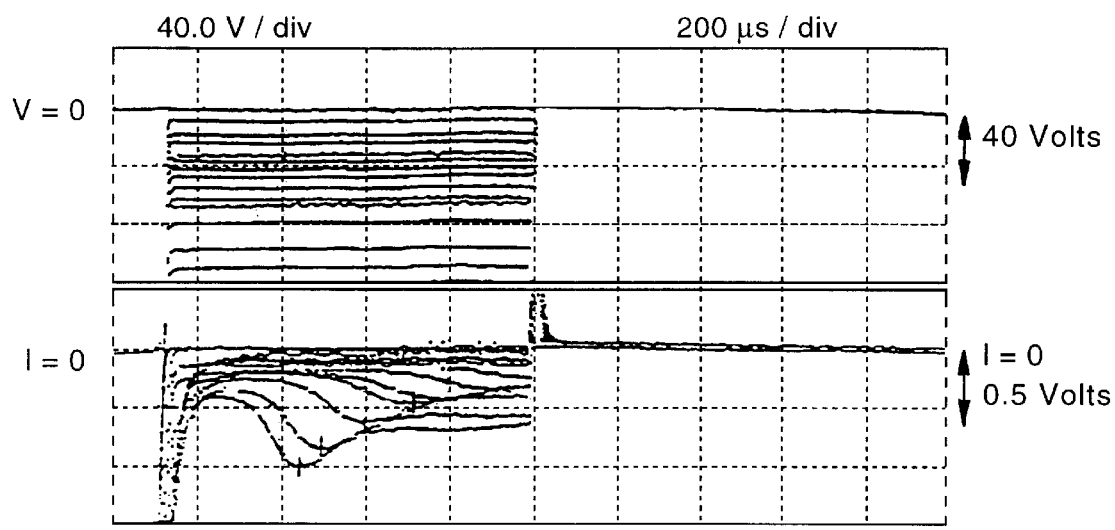
Figure 14B:
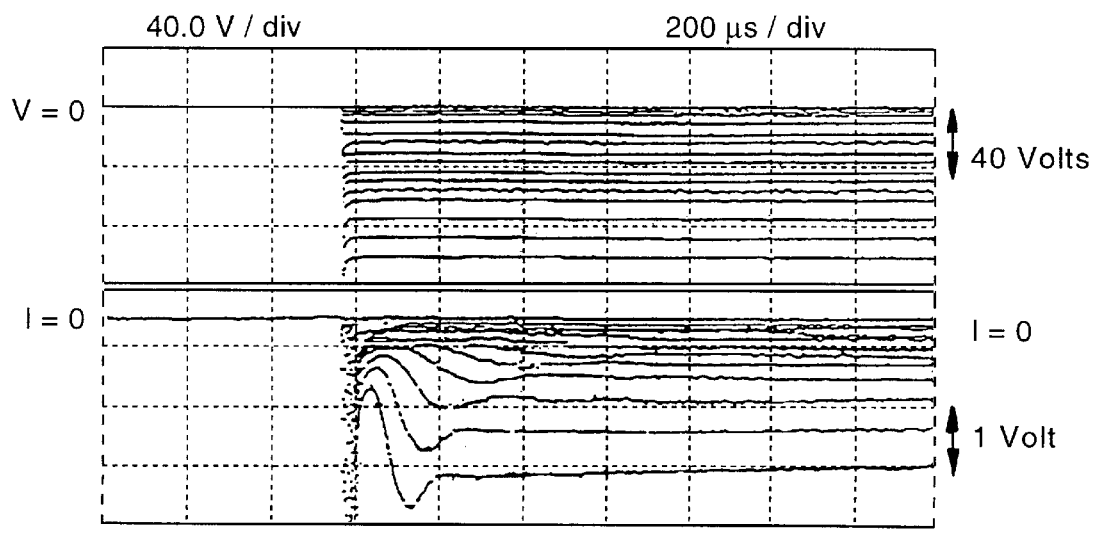

FIGS. 14a and 14b illustrate the growth of the Felici peak in the ion current for various pulse strengths. The specimen in FIG. 14a possesses fewer ions than that in FIG. 14b. In accordance with the theory, the curves in FIGS. 14 show that the higher the ion density the more rapid is the Felici peak.

It should be noted that the pulse length most suitable for creating an array of surface defects is determined experimentally within the range lying between the initial point and the maximum of the Felici peak, that is to say close to the maximum in the liquid mass current.

The formation of the array of surface defects is, in all cases, subjected to a surface anchoring breaking, which defines a second threshold for the applied field.

It is also important to clearly understand the influence of the thickness d of the device on the phenomenon described above.

In order to facilitate surface anchoring breaking with potentials of reasonable strength, it is advantageous to reduce the thickness in order to increase the field, since surface anchoring breaking is a field effect. This is also useful in order to reduce the relaxation time of the texture, which increases as $d^2$.

However, on the other hand, it is necessary to reach the Felici threshold in order to create the pattern of surface defects. This voltage threshold increases as $1/d^2$.

Consequently, the critical thickness $d_c$ exists for which the Felici threshold and the threshold for surface anchoring breaking are optimized.

The Felici threshold gives $qVd^2 = Const_1$. The surface anchoring breaking gives $V/d = Const_2$. Thus the equation $qV^3 = Const_3$, or $qd^3 = Const_4$, is obtained.

Of course, the system may be improved by increasing the density of injected charge q in order to reduce V or reduce d.

Of course, the present invention is not limited to the embodiments described above but extends to all alternative forms in accordance with its spirit.

Those skilled in the art will understand, moreover, that unipolar charge injection is not necessarily produced on the homeotropic plate 20. It could be produced by a suitable treatment on the quasi-bistable plate 30. By way of nonlimiting example, it will be possible to employ, on the plate 30, a surface treatment using an ionic silane compatible with a quasi-bistable anchoring. This silane may be chosen from the group of materials giving only a planar anchoring. The homeotropic anchoring on the plate 20 would then be produced by a silane which is nonionic (in order not to favor injection) or one which is ionic but allows injection.

Furthermore, the present invention is not limited to the creation of surface defects by the Felici effect. In fact, creating surface defects by flow vortex induction, above a plate with broken anchoring, may result in other electrodynamic instabilities.

Among these instabilities, mention may be made of Williams' convective eddy motions, which is a permanent dynamic instability, and all the static texture instabilities in their transient-establishing state: once a nematic texture has been reoriented, a transient hydrodynamic current is created which may appear in the form of convective eddy motions and initiate the surface defects necessary for writing. Erasure will occur by applying an alternating field of frequency greater than the charge relaxation frequency $\omega=4\pi\sigma/\epsilon$, where $\sigma$ is the conductivity of the liquid crystal and $\epsilon$ its dielectric constant.

Typically, an alternating pulse of single period of duration $\tau$ compatible with the rate of writing of the display device will be used. The aforementioned instabilities are described in the work: "The Physics of Liquid Crystals" by P. G. de Gennes and J. Prost, Oxford Science Publications, Clarendon Press, Oxford (1993). The flows associated with the changes in texture are also described in this classic work.

Moreover, within the context of the present invention, the term "quasi-bistable" anchoring should be understood to mean that at least one of the plates 30 defines a monostable ground state and at least two possible higher-energy anchoring states, there possibly being more than two of these possible higher-energy states. In other words, the term "quasi-bistable" should be regarded as encompassing the "quasi-multistable" anchorings.

According to another alternative embodiment in accordance with the present invention, each of the two plates 20 and 30 is suitable for defining a quasi-bistable anchoring.

We claim:

1. A display device based on liquid crystals comprising a nematic liquid-crystal material with positive dielectric anisotropy sandwiched between two transparent confinement plates each provided with transparent electrodes, wherein at least one of the plates defines a quasi-bistable anchoring corresponding to a surface ground state which is monostable and planar and further includes the presence of slightly higher energy bistable anchorings which are also planar or slightly oblique, said device being provided with main electrical supply means suitable for applying a temporary electric field to the liquid-crystal material capable of breaking the anchoring on the aforementioned plate and subsequently allowing, due to the effect of hydrodynamic instabilities, various localized orientations of the liquid-crystal molecules corresponding to the preferred orientations of the quasi-bistable anchoring.

2. The display device as claimed in claim 1, which furthermore comprises secondary electrical supply means (40) capable of applying an erasing electric field to the liquid-crystal material (10) making it possible to re-establish an anchoring of uniform orientation on the plate (30) exhibiting a quasi-bistable anchoring.

3. The display device as claimed in claim 1, wherein the plate (30) defining a quasi-bistable anchoring defines a monostable ground surface state while at the same time allowing at least one higher-energy bistable anchoring.

4. The display device as claimed in claim 3, wherein the monostable ground surface state corresponds to a planar anchoring while the allowed bistable anchoring corresponds to two oblique orientations which are symmetrical with respect to the monostable ground surface state.

5. The display device as claimed in claim 3, wherein the bistable anchoring is defined by controlled oblique evaporation of SiO.

6. The display device as claimed in claim 1, wherein each of the two plates (20, 30) defines a quasi-bistable anchoring.

7. The display device as claimed in claim 1, wherein at least one of the plates, (20) or (30), is suitable for injecting charges of controlled polarity into the liquid-crystal material (10).

8. The display device as claimed in claim 7, wherein the plate (20) opposite that (30) defining the quasi-bistable anchoring is suitable for injecting charges of defined polarity into the liquid-crystal material (10).

9. The display device as claimed in claim 1, wherein the quasi-bistable plate (30) is suitable for injecting charges of defined polarity into the liquid-crystal material (10).

10. The display device as claimed in claim 2, wherein the secondary electrical supply means (40) are suitable for generating electrical pulses of polarity opposite to that of the main electrical supply means.

11. The display device as claimed in claim 2, wherein the secondary electrical supply means (40) are designed to generate electrical pulses of the same polarity as the main electrical supply means, with a strength sufficient to break the anchoring but less than that required to obtain hydrodynamic instabilities, when their threshold is greater than that of the anchoring of the quasi-bistable plate.

12. The display device as claimed in claim 1, wherein it comprises a current-injection electrode (22) consisting of an alternation of electrically conductive and nonconductive bands.

13. A display device based on liquid crystals comprising a nematic liquid-crystal material with positive dielectric anisotropy sandwiched between two transparent confinement plates each provided with transparent electrodes, at least one of the plates defining a quasi-bistable anchoring, said device being provided with main electrical supply means suitable for applying a temporary electric field to the liquid-crystal material capable of breaking the anchoring on the aforementioned plate and subsequently allowing, due to the effect of hydrodynamic instabilities, various localized orientations of the liquid-crystal molecules corresponding to the preferred orientations of the quasi-bistable anchoring, wherein the plate defining a quasi-bistable anchoring defines a monostable ground surface state while at the same time allowing at least one higher-energy bistable anchoring and the bistable anchoring is defined by thin Langmuir-Blodgett films exhibiting an optical anisotropy after absorption of polarized light in two perpendicular directions.

14. A display device based on liquid crystals comprising a nematic liquid-crystal material with positive dielectric anisotropy sandwiched between two transparent confinement plates each provided with transparent electrodes, at least one of the plates defining a quasi-bistable anchoring, said device being provided with main electrical supply means suitable for applying a temporary electric field to the liquid-crystal material capable of breaking the anchoring on the aforementioned plate and subsequently allowing, due to the effect of hydrodynamic instabilities, various localized orientations of the liquid-crystal molecules corresponding to the preferred orientations of the quasi-bistable anchoring, wherein the plates define, in the off state, a hybrid structure for the liquid-crystal molecules: planar on the quasi-bistable anchoring plate and homeotropic on the opposite plate.

15. A display device based on liquid crystals comprising a nematic liquid-crystal material with positive dielectric anisotropy sandwiched between two transparent confinement plates each provided with transparent electrodes, at least one of the plates defining a quasi-bistable anchoring, said device being provided with main electrical supply means suitable for applying a temporary electric field to the liquid-crystal material capable of breaking the anchoring on the aforementioned plate and subsequently allowing, due to the effect of hydroxynamic instabilities, various localized orientations of the liquid-crystal molecules corresponding to the preferred orientations of the quasi-bistable anchoring, wherein the main electrical supply means are designed to apply electric-field pulses of variable strength to the liquid-crystal material, making it possible to modulate the resulting optical contrast.

16. A display device based on liquid crystals comprising a nematic liquid-crystal material with positive dielectric anisotropy sandwiched between two transparent confinement plates each provided with transparent electrodes, at least one of the plates defining a quasi-bistable anchoring, said device being provided with main electrical supply means suitable for applying a temporary electric field to the liquid-crystal material capable of breaking the anchoring on the aforementioned plate and subsequently allowing, due to the effect of hydrodynamic instabilities, various localized orientations of the liquid-crystal molecules corresponding to the preferred orientations of the quasi-bistable anchoring, wherein the main electrical supply means are designed to reach the Felici threshold given by the equation $$qEd^3/\eta D \approx 1$$

in which:

q represents the average charge density per unit volume;

E represents the electric field;

D represents the thickness of the cell;

$\eta$ represents the average nematic viscosity; and

D represents the diffusion coefficient for ions.

17. A display device based on liquid crystals comprising a nematic liquid-crystal material with positive dielectric anisotropy sandwiched between two transparent confinement plates each provided with transparent electrodes, at least one of the plates defining a quasi-bistable anchoring, said device being provided with main electrical supply means suitable for applying a temporary electric field to the liquid-crystal material capable of breaking the anchoring on the aforementioned plate and subsequently allowing, due to the effect of hydrodynamic instabilities, various localized orientations of the liquid-crystal molecules corresponding to the preferred orientations of the quasi-bistable anchoring, said device further comprising secondary electrical supply means capable of applying an erasing electric field to the liquid-crystal material making it possible to re-establish an anchoring of uniform orientation on the plate exhibiting a quasi-bistable anchoring, wherein the secondary electrical supply means are designed to generate alternating electrical pulses with a strength comparable to that of the main means and with a frequency sufficiently high not to induce hydrodynamic instabilities.

18. A display device based on liquid crystals comprising a nematic liquid-crystal material with positive dielectric anisotropy sandwiched between two transparent confinement plates each provided with transparent electrodes, at least one of the plates defining a quasi-bistable anchoring, said device being provided with main electrical supply means suitable for applying a temporary electric field to the liquid-crystal material capable of breaking the anchoring on the aforementioned plate and subsequently allowing, due to the effect of hydrodynamic instabilities, various localized orientations of the liquid-crystal molecules corresponding to the preferred orientations of the quasi-bistable anchoring, wherein the plate opposite that defining a quasi-bistable anchoring possesses a silane coating.

19. A display device based on liquid crystals comprising a nematic liquid-crystal material with positive dielectric anisotropy sandwiched between two transparent confinement plates each provided with transparent electrodes, at least one of the plates defining a quasi-bistable anchoring, said device being provided with main electrical supply means suitable for applying a temporary electric field to the liquid-crystal subsequently allowing, due to the effect of hydrodynamic instabilities, various localized orientations of the liquid-crystal molecules corresponding to the preferred orientations of the quasi-bistable anchoring, wherein the plate opposite that defining a quasi-bistable anchoring possesses a DMOAP silane coating.

20. A display device based on liquid crystals comprising a nematic liquid-crystal material with positive dielectric anisotropy sandwiched between two transparent confinement plates each provided with transparent electrodes, at least one of the plates defining a quasi-bistable anchoring, said device being provided with main electrical supply means suitable for applying a temporary electric field to the liquid-crystal material capable of breaking the anchoring on the aforementioned plate and subsequently allowing, due to the effect of hydrodynamic instabilities, various localized orientations of the liquid-crystal molecules corresponding to the preferred orientations of the quasi-bistable anchoring, wherein the plate defining a quasi-bistable anchoring is coated with an ionic silane material allowing injection, compatible with the quasi-bistable anchoring.

21. A display device based on liquid crystals comprising a nematic liquid-crystal material with positive dielectric anisotropy sandwiched between two transparent confinement plates each provided with transparent electrodes, at least one of the plates defining a quasi-bistable anchoring, said device being provided with main electrical supply means suitable for applying a temporary electric field to the liquid-crystal material capable of breaking the anchoring on the aforementioned plate and subsequently allowing, due to the effect of hydrodynamic instabilities, various localized orientations of the liquid-crystal molecules corresponding to the preferred orientations of the quasi-bistable anchoring, wherein said device comprises a current-injection electrode consisting of an alternation of electrically conductive and nonconductive bands, the alternation of bands being produced by rubbing an electrode.

22. A display device based on liquid crystals comprising a nematic liquid-crystal material with positive dielectric anisotropy sandwiched between two transparent confinement plates each provided with transparent electrodes, at least one of the plates defining a quasi-bistable anchoring, said device being provided with main electrical supply means suitable for applying a temporary electric field to the liquid-crystal material capable of breaking the anchoring on the aforementioned plate and subsequently allowing, due to the effect of hydrodynamic instabilities, various localized orientations of the liquid-crystal molecules corresponding to the preferred orientations of the quasi-bistable anchoring, wherein the hydrodynamic instabilities consist of the Felici instability.

23. A display device based on liquid crystals comprising a nematic liquid-crystal material with positive dielectric anisotropy sandwiched between two transparent confinement plates each provided with transparent electrodes, at least one of the plates defining a quasi-bistable anchoring, said device being provided with main electrical supply means suitable for applying a temporary electric field to the liquid-crystal material capable of breaking the anchoring on the aforementioned plate and subsequently allowing, due to the effect of hydrodynamic instabilities, various localized orientations of the liquid-crystal molecules corresponding to the preferred orientations of the quasi-bistable anchoring, wherein the quasi-bistable anchoring is defined by a layer of polymer containing dichroic compounds, after two exposures to polarized light, in perpendicular directions.

* * * * *

UNITED STATES PATENT AND TRADEMARK OFFICE
CERTIFICATE OF CORRECTION

PATENT NO. : 5,995,173
DATED : November 30, 1999
INVENTOR(S) : Barberi et al.

It is certified that error appears in the above-identified patent and that said Letters Patent is hereby corrected as shown below:

[73] Assignee: Istituto Nazionale per La Fisica Della Materia, Genova, Italy

Signed and Sealed this

Fourteenth Day of August, 2001

*Attest:*

*Attesting Officer*

NICHOLAS P. GODICI
*Acting Director of the United States Patent and Trademark Office*